UNITED STATES PATENT OFFICE.

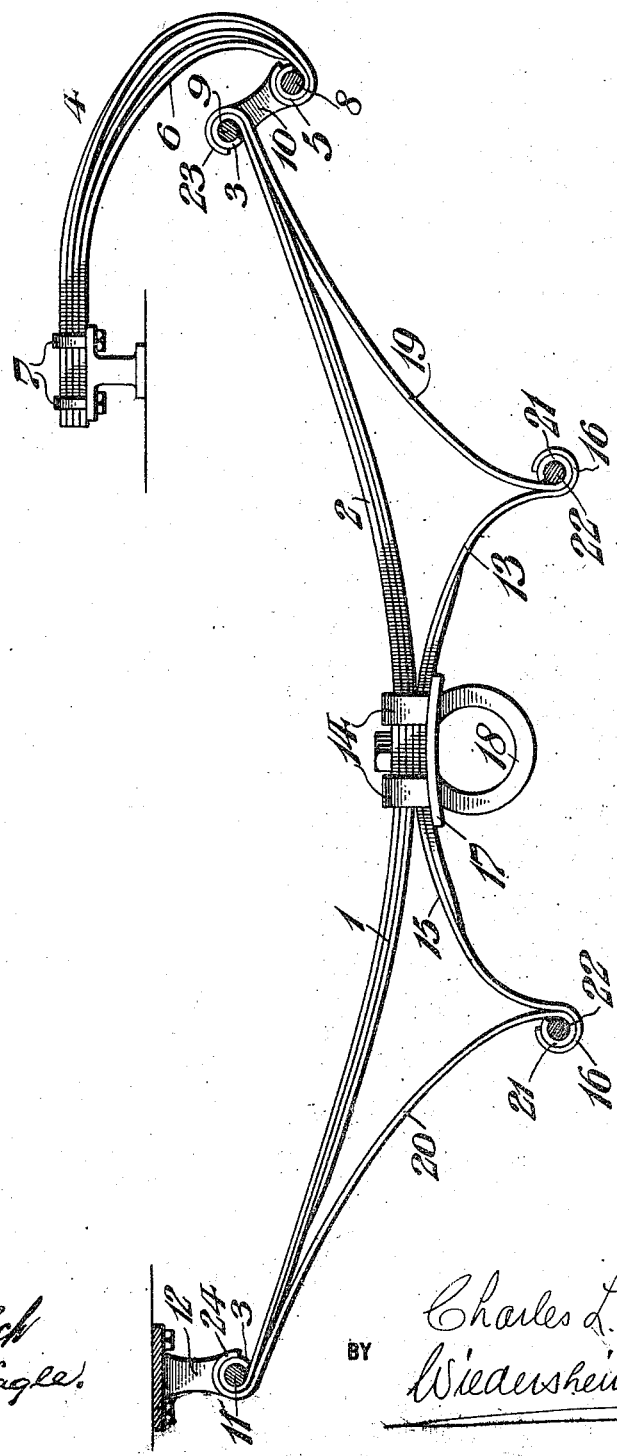

CHARLES L. SCHWARZ, OF PHILADELPHIA, PENNSYLVANIA.

VEHICLE-SPRING.

1,182,219.  Specification of Letters Patent.  Patented May 9, 1916.

Application filed November 17, 1913. Serial No. 801,383.

*To all whom it may concern:*

Be it known that I, CHARLES L. SCHWARZ, a citizen of the United States, residing in the city and county of Philadelphia, State of Pennsylvania, have invented a new and useful Vehicle-Spring, of which the following is a specification.

My invention consists of a composite vehicle spring comprising a main-spring and auxiliary springs by means of which increase of load causes increase of resistance, and which serve to counteract rebound in the spring.

It further consists of such spring, in which the curvatures of the main-spring and of the auxiliary springs are opposed, so that flattening of the main-spring under load will be transferred to the auxiliary springs, and increase of curvature of the main-spring by release of load will cause corresponding decrease of curvature of the auxiliary springs.

It further consists of other novel features of construction, all as will be hereinafter fully set forth.

The annexed drawings and the following description set forth in detail one mechanical form embodying the invention, such detail construction being but one of various mechanical forms in which the principle of the invention may be used.

The figure represents a side elevation of a vehicle spring embodying my invention.

Referring to the drawings, the reference numeral 1 indicates the main-spring which is of any desired form and composed of any number of leaves, and is disclosed as composed of three superimposed leaves, one of which, here shown as the uppermost one, 2, has its ends curved to form eyes, 3.

A spring-hanger, 4, is formed from a number of curved leaves, a suitable number of which, as for example, two, have their ends curved to form eyes, 5, which are separate and relatively movable independently of each other, and a suitable number of which leaves have one end free for sliding movement with respect to the other leaves, one of said leaves with the free end having the same bearing on the under side of the leaf carrying the eye. This spring-hanger is secured to the body of the vehicle or chassis of the motor-car, whichever form the spring is applied to, by means of clips through the eye of the spring-hanger and a bolt, 9, passes through the eye at one end of the mainspring and the ends of said bolt are movably connected by links 10. The eye upon the opposite end of the main-spring is pivoted upon a bolt, 11, in a bracket, 12, upon the body or chassis of the vehicle.

A central auxiliary spring, 13, is secured by a clip or clips 14 to the main-spring intermediate the ends of each, and to the axle of the vehicle, and consists in the illustrated instance of two leaves, in the present instance, the upper one, 15, of which is formed with eyes, 16, at its ends. The clip or clips 14 secure the central auxiliary spring and the main-spring to the support, 17, which is secured to the vehicle axle in any suitable or desired manner, as, for example, by a strap, 18. Auxiliary end springs, 19 and 20, formed of any suitable number of leaves, here shown as one, have their inner ends formed with eyes, 21, which are pivotally secured upon bolts, 22, and as here shown the said eyes 21 have the eyes 16 of the central auxiliary spring pivotally or movably engaging them, whereby the two eyes are relatively movable, independently of each other. The outer ends of said auxiliary end-springs are formed, respectively, with eyes 23 and 24, which as here shown, engage the curved ends 3 of the main-spring and have movement upon the same, whereby the eyes are also relatively movable independently of each other.

It will be understood that I do not desire to be limited to the manner of forming the eyes nor of their relation to each other, as the same may be formed in any suitable manner and mounted with respect to each other as may be desired.

In the action of my improved spring, the main spring under load, will, as the body of the vehicle approaches the axle, tend to flatten out and create such pressure and strain on the central and end auxiliary springs, as will cause them to flex and increase their curvature, with the result that their resistance to distortion, will be added to the resistance offered by the main spring, and will thus resiliently reinforce the main spring in taking the load. In the rebound of the body from the axle, the main spring will be relieved of its tension, and its curvature will be increased, while at the same time the auxiliary springs will also be released, and as the separation of the parts continues, the auxiliary springs will tend to flatten, and will oppose in increased ratio, the rebound of the body, and will effectually check it. It is seen therefore that my improved form of spring, while increasing the load bearing capacity of the body, will prevent objectionable rebound, and this without interfering with the resiliency of the support afforded the body, or impairing the consequent easy riding qualities of the same. The spring-hanger will afford yielding support for the ends of the main and auxiliary springs, and such spring-hanger together with the movable connection with the springs will admit of relative longitudinal movement of the axle and vehicle body or chassis during compression or expansion of the springs.

By forming the spring-hanger 4 of a plurality of leaves, any number of which may have one end free for sliding movement, and having one or more of said leaves formed with an eye, which eyes are in separate movable relation, independently of each other, I provide a structure in which there is little friction and greater carrying capacity with less material.

It will be oberved that the central auxiliary spring is considerably less in length than that of the main spring 1, and that the end springs 19 constitute in effect, tie members which tie the ends of the two springs together. This relation of the main and central springs I deem of importance and advantage for the reason that they will possess different rates of vibration, the longer spring having a relatively slow rate, and the shorter spring a relatively high rate. Therefore by tying the two springs together by the members 19, the vibrations of the two springs being at different rates, will be caused to interfere with one another, with the result that the vibrations will be dampened out, and their cumulative effect prevented. At slow speeds or slow loading, no particular change in the action of the springs will be noticeable over that which would be due to a simple summation of their load resistances for given deflections; but when the successive deflections come in rapid succession, then this interference or dampening out effect becomes pronounced. The need for such dampening out for springs used under vehicles, becomes greater the greater the speed of the vehicle, and this construction provides for proportionately increasing the interference under such conditions.

Other modes of applying the principle of my invention may be employed for the mode herein explained. Change may therefore be made as regards the mechanism thus disclosed, provided the principles of construction set forth, respectively, in the following claims are employed.

Having thus described my invention, what I claim as new and desire to secure by Letters Patent, is:—

1. A vehicle spring comprising a curved main leaf spring, an auxiliary leaf spring of less length than that of the main spring and comprising a top leaf of opposite curvature to said main leaf spring and an underlying leaf of like curvature to the top leaf, said main and auxiliary springs being fastened together with their convex sides in juxtaposition, and tie members connecting the outer ends of said top leaf of the auxiliary spring with the outer ends of the main leaf spring; whereby the vibrations of the main and auxiliary springs will interfere with each other and be damped out, and the summation of the resistances of both leaves of the auxiliary spring will be opposed to a compression load on the springs.

2. A vehicle spring comprising a curved main leaf spring, an auxiliary leaf spring of less length than that of the main spring and comprising a top leaf of opposite curvature to said main leaf spring and an underlying leaf of like curvature to the top leaf, said main and auxiliary springs being fastened together with their convex sides in juxtaposition, and tie members in the form of end leaf springs connecting the outer ends of the top leaf of the auxiliary spring with the outer ends of the main spring; whereby the vibrations of the main and auxiliary springs will interfere with each other and be damped out, and the summation of resistances of both leaves of the auxiliary spring will be opposed to a compression load on said springs.

CHARLES L. SCHWARZ.

Witnesses:
C. D. McVay,
F. A. Newton.